Oct. 16, 1934. A. SARGENT 1,977,209
ELECTRIC CABLE
Filed Dec. 1, 1931
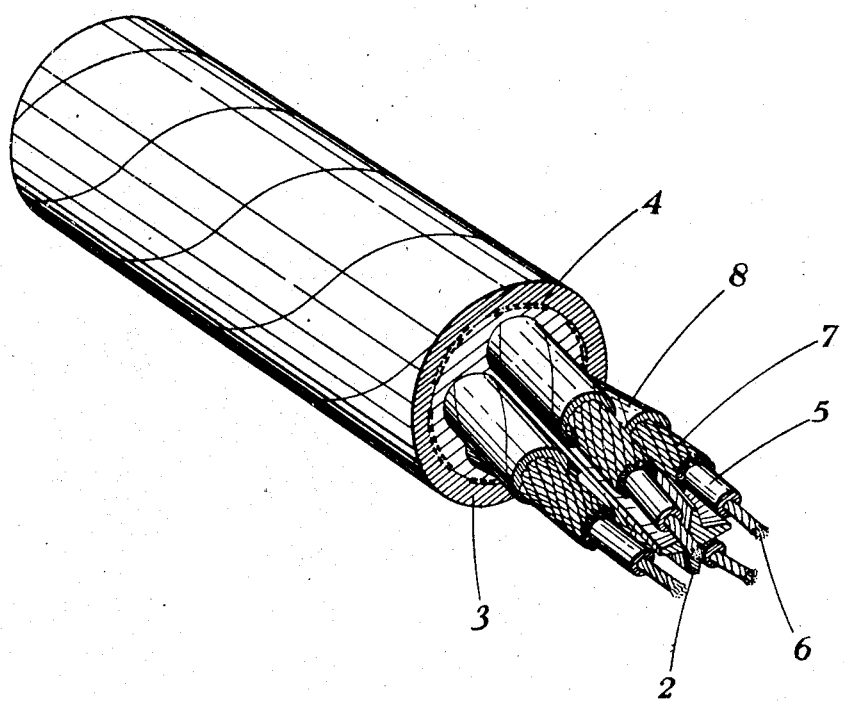
INVENTOR
Alfred Sargent
BY
Byrnes, Stebbins, Parmelee & Blenko
ATTORNEYS Patented Oct. 16, 1934

1,977,209

UNITED STATES PATENT OFFICE 1,977,209

ELECTRIC CABLE

Alfred Sargent, Derby, England, assignor to The Macintosh Cable Company Limited, Derby, England, a British company Application December 1, 1931, Serial No. 578,275
In Great Britain December 9, 1930

1 Claim. (Cl. 173—264)

This invention relates to electric cables of types which require to be capable of undergoing without injury repeated bending of a comparatively small radius. Mine trailing cables are of this kind. It is the object of the invention to provide an improved method of manufacture of the cores for use in such cables which will give the cable the power to withstand severe treatment without injury to the wires. The core construction is of the kind in which a large number of fine wires are laid helically round a circular center of relatively large diameter formed of yielding material. Two classes of material have been used for the yielding center. These are textile cords and rubber. Of these two classes, rubber has superior qualities of flexibility and local yielding and of homogeneous structure, but it has not been possible to utilize these qualities to their full extent by the methods of manufacture adopted previously. The reason for this failure is found in the action of the wires on the rubber center during the process of laying the wires round the center. It has to be remembered that flexible cables usually have insulation and often sheathing of rubber which has to be vulcanized after application to the cores. It is therefore usually necessary to have the center unvulcanized at the time when the wires are being laid round it. Since the wires are small in relation to the center and are applied simultaneously by the stranding machine, round the whole circle they exert an approximately uniform radial compression on the center. This results in the permanent elongation of the rubber center and the reduction of the diameter below the required value at which it can give effective resilient support to the wires. The action of the stranding machine forces the wires inwards until they lie close together so that the limit of the diameter of the circle of wires on the center is with known methods of manufacture fixed by the condition that a complete circle of wires pressed firmly against each other is formed. Under this condition the rubber can provide very little, if any, resilient support.

In manufacturing in accordance with the present invention, the first stage is the production of an inextensible rubber center. This is produced by extruding rubber round a textile core or strip in such a way that the rubber adheres to the strip. After this the center is partially vulcanized and then the fine conductor wires are laid up helically round it and to form a substantially complete layer of wires enclosing the center. Rubber insulation is then applied to the outside of the core and finally the whole is vulcanized.

It results from this method of manufacture that the wires are initially supported by the center so that the flexibility of the core is increased and, further, the rubber is supported continuously by the cord which practically determines the nature of the deformation of the center. This last mentioned result is explained as follows:

As is well known, rubber does not change in volume under pressure; the presence of the cord practically prevents elongation of the center; therefore the perimeter of the center at any plane of cross section cannot be reduced to a value less than that of the initial circle. The production of the inward depression of one part of the circle produces an outward projection at some other part or parts. From this it follows that the initial support given to the wires cannot be destroyed under bending of the cable and the wires cannot be forced sideways against each other.

Both the initial support and the support during bending reduce the possibility of the chafing of the wires by sideways pressure when the cable is in use. In general, flexible cables have their conductors made up of a number of fine wires twisted together into groups and these groups form the elements which are laid side by side around the center. The chafing of these groups by rubbing against each other which ultimately produces fracture of the fine wires, is one of the important limits set to the life of a trailing cable in a mine or in other similar severe service. Accordingly, the invention, in addition to providing increased flexibility, also gives an increased life to such a cable.

The rubber centers and/or the textile cords or strips embedded in them may be used to give by colour effects the means of identifying the several cores and distinguishing them from each other, thus dispensing with colouring of the insulating rubber or the application of a coloured tape or braid to the outside of the core.

The accompanying drawing shows a trailing cable in which the invention has been embodied. In this cable there are four cores, laid up round the star-shaped center 2 and covered by the sheath 3 of tough rubber, in which is embedded the protective braid 4.

Each core has a rubber center 5 through which extends longitudinally a cord 6 to which the rubber adheres. Round the center are laid up helically side by side groups of fine wires 7, the wires in each group being stranded together. These wires form the conductor. The core is completed by a layer of rubber dielectric 8.

What I claim as my invention and desire to secure by Letters Patent is:—

A method of manufacturing an electric cable comprising one or more cores consisting of a large number of fine wires surrounding a relatively large center of yielding material, said method comprising making the yielding center in circular shape by extruding rubber round a textile cord or strip so as to adhere thereto, then partially vulcanizing the center, then laying-up the fine conductor wires helically round and upon the center and to form a substantially complete layer of wires enclosing the center, then applying vulcanizable insulating material to the outside of the ring of wires and then vulcanizing the whole.

ALFRED SARGENT.